Jan. 15, 1963  A. HASBROUCK  3,073,111
ROCKET NOZZLE
Filed April 23, 1959
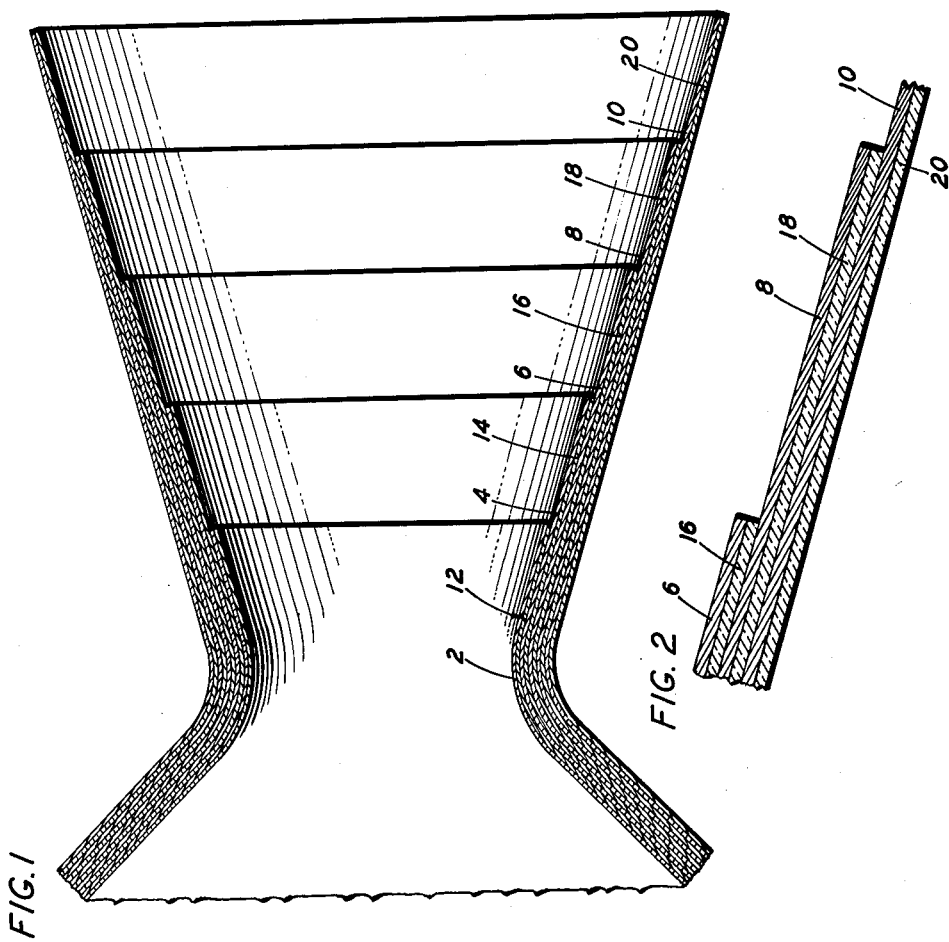
INVENTOR
AUGUSTUS HASBROUCK
BY Charles A. Warren
ATTORNEY … # 3,073,111
ROCKET NOZZLE
Augustus Hasbrouck, Middletown, Conn., assignor to United Aircraft Corporation, East Hartford, Conn., a corporation of Delaware
Filed Apr. 23, 1959, Ser. No. 808,514
3 Claims. (Cl. 60—35.6)

This invention relates to a laminated nozzle particularly adapted for use in a rocket.

One feature of the invention is the arrangement of the nozzle as a multiple layered structure in which the alternate metallic layers are protected and spaced apart by a non-metallic heat resistant layer or coating. Another feature is the shaping of each layer to the contour of the nozzle so that if the innermost layers burn away during operation the basic shape of the nozzle will not be affected. Another feature is the arrangement of the inner layers so that they terminate short of the downstream end of the nozzle in stepped relation to one another, in order to mantain structural integrity in areas of high internal pressure as at the throat without unnecessary weight in the low pressure areas downstream of the throat.

Other features and advantages will be apparent from the specification and claims, and from the accompanying drawings which illustrate an embodiment of the invention.

FIG. 1 is a longitudinal sectional view through a nozzle embodying the invention.

FIG. 2 is a fragmentary section on a larger scale of a portion of the nozzle.

As shown in FIG. 1 the nozzle is made up of a plurality of concentric nozzle-shaped sleeves 2, 4, 6, 8 and 10 which are metallic and which are held in closely spaced concentric relation to each other by layers 12, 14, 16, 18 and 20 of a non-metallic heat resistant material such as a ceramic. The metallic sleeves provide the necessary strength to withstand the pressure loading on the nozzle and the non-metallic layers serve as heat insulation and also serve to maintain the metallic sleeves in precise and uniform spaced relation to each other. In some instances the material of the non-metallic sleeves may have ablating characteristics such that gases from these sleeves will cool the adjacent metallic sleeves.

Since all of the sleeves are the same shape and in any longitudinal section are parallel to each other it will be apparent that each metallic sleeve has the same convergent-divergent character and the nozzle retains its shape and is still effective even if the innermost metallic sleeves 2 and 4 should be burned away during the use of the nozzle in a rocket. Each inner metallic sleeve is shorter than the next adjacent outer one and terminates short of the outer sleeve at the downstream end, as clearly shown, so that the downstream ends of the metallic sleeves are in stepped relation to each other.

One proposed method for making a nozzle of this type is to form a series of concentric metal spinnings. Thus the innermost sleeve 2 could be spun to the desired shape and the non-metallic sleeve or coating 12 could then be applied thereto by any suitable known means. The sleeve 4 could then be spun onto the combined sleeves 2 and 12 and the non-metallic coating 14 then applied to the sleeve 4. The subsequent metallic sleeves and non-metallic layers would be added in like manner until the desired thickness and strength in the nozzle is obtained. Alternatively, the build-up could be started from the outermost sleeve 20 working toward the innermost sleeve 2. It will be understood that the completed nozzle may be coated over its entire inner surface with a ceramic or other heat resistant material for added protection of the nozzle structure. This coating is not shown since it is not a part of the present invention.

A nozzle construction build-up in this way may have extremely thin metallic sleeves for strength purposes and equally thin non-metallic sleeves for heat insulation purposes positioned between and spacing apart the adjacent metallic sleeves or laminations. By the use of a sufficient number of the metallic laminations, it is possible to produce a nozzle of adequate strength once the pressures acting on the nozzle are determined. As above stated, if the innermost sleeve 2 should burn off during the operation of the nozzle on a rocket, the non-metallic coating will protect the next metallic lamination and, the next sleeve being the same configuration, the nozzle will continue to function during the remainder of its operation in the rocket.

It is to be understood that the invention is not limited to the specific embodiment herein illustrated and described, but may be used in other ways without departure from its spirit as defined by the following claims.

I claim:

1. A nozzle construction for a rocket in which the nozzle forms a convergent-divergent passage, the nozzle wall including a plurality of thin metallic axially elongated sleeves and non-metallic layers in the form of sleeves between and spacing the adjacent metallic sleeves, each non-metallic sleeve terminating short of the downstream end of the next outer metallic sleeve, at least a part of each of said metallic sleeves cooperating to form the inner divergent wall portion of the nozzle.

2. A nozzle construction for a rocket in which the nozzle wall forms an axially elongated convergent-divergent passage, said nozzle wall including a plurality of pairs of elongated thin sleeves of like convergent-divergent shape, each pair comprising a metallic sleeve and a non-metallic sleeve of substantially equal thickness and of substantially equal length closely overlying each other, the several pairs of sleeves being so arranged relative to each other that the non-metallic sleeve of each pair closely overlies the metallic sleeve of the next outer pair, each pair of sleeves terminating in said divergent passage short of the downstream end of the next outer pair with at least a portion of the metallic sleeve of each pair exposed in said passage.

3. A nozzle construction for a rocket in which the nozzle wall forms a convergent-divergent passage, said wall including a plurality of pairs of axially elongated thin sleeves of similar convergent-divergent shape, each pair including a metallic sleeve and a non-metallic sleeve of substantially the same length, each pair of metallic and non-metallic sleeves terminating short of the downstream ends of the next adjacent outer pair of sleeves to expose a part of the metallic sleeve of each pair in said divergent passage, the exposed parts of the metallic sleeves of the several pairs of sleeves forming the inner divergent wall of the nozzle passage.

(References on following page)

References Cited in the file of this patent

UNITED STATES PATENTS

| | | | |
|---|---|---|---|
| 1,888,749 | Urquhart | Nov. 22, | 1932 |
| 2,023,025 | McKee | Dec. 3, | 1935 |
| 2,317,734 | Cook | Apr. 27, | 1943 |
| 2,496,351 | Mazzoni | Feb. 7, | 1950 |
| 2,601,311 | McCormick | June 24, | 1952 |
| 2,695,495 | Peterman | Nov. 30, | 1954 |
| 2,699,036 | Nicholson | Jan. 11, | 1955 |
| 2,779,997 | Borman | Feb. 5, | 1957 |
| 2,835,107 | Ward | May 20, | 1958 |
| 2,849,860 | Lowe | Sept. 2, | 1958 |
| 2,926,490 | Eaton et al. | Mar. 1, | 1960 |
| 2,958,184 | Sanders | Nov. 1, | 1960 |

FOREIGN PATENTS

| | | | |
|---|---|---|---|
| 1,108,090 | France | Oct. 17, | 1955 |
| 1,112,030 | France | Nov. 9, | 1955 |